United States Patent
Xiong et al.

(10) Patent No.: US 10,384,541 B2
(45) Date of Patent: Aug. 20, 2019

(54) LASER RADAR MODULE AND ROBOT

(71) Applicant: UBTECH Robotics Corp., Shenzhen (CN)

(72) Inventors: Youjun Xiong, Shenzhen (CN); Libing Zhou, Shenzhen (CN); Wenhua Yu, Shenzhen (CN)

(73) Assignee: UBTECH Robotics Corp., Shenzhen (CN)

( * ) Notice: Subject to any disclaimer, the term of this patent is extended or adjusted under 35 U.S.C. 154(b) by 21 days.

(21) Appl. No.: 15/647,263

(22) Filed: Jul. 12, 2017

(65) Prior Publication Data

US 2018/0334033 A1  Nov. 22, 2018

(30) Foreign Application Priority Data

May 19, 2017 (CN) .......................... 2017 1 0355332
May 19, 2017 (CN) .......................... 2017 1 0355364

(51) Int. Cl.
| | | |
|---|---|---|
| *B62D 1/24* | (2006.01) | |
| *B60K 31/02* | (2006.01) | |
| *B60K 1/00* | (2006.01) | |
| *B60K 17/04* | (2006.01) | |
| *B60K 7/00* | (2006.01) | |

(52) U.S. Cl.
CPC ............... *B60K 31/02* (2013.01); *B60K 1/00* (2013.01); *B60K 7/0007* (2013.01); *B60K 17/04* (2013.01); *B60K 2007/0092* (2013.01)

(58) Field of Classification Search
CPC .... B60K 31/02; B60K 31/00; B60K 31/0008; B60K 31/0058; B60K 31/0016; B60K 1/00; B60K 17/04; B60K 2350/20; B60K 2350/2013; B60K 2350/2047; B60K 2350/921; B60K 2350/924; B65G 47/52; B65G 47/61; B65G 47/46; B65G 47/60
See application file for complete search history.

(56) References Cited

U.S. PATENT DOCUMENTS

| | | | | |
|---|---|---|---|---|
| 4,698,775 A | * | 10/1987 | Koch ........................ | B25J 5/007 414/265 |
| 4,710,020 A | * | 12/1987 | Maddox .................... | G01C 3/22 180/167 |
| 5,202,832 A | * | 4/1993 | Lisy ....................... | G05D 1/0236 414/343 |
| 5,279,672 A | * | 1/1994 | Betker .................. | A47L 11/305 134/18 |
| 5,936,240 A | * | 8/1999 | Dudar ...................... | G01V 5/02 250/253 |
| 7,250,849 B2 | * | 7/2007 | Spriggs ..................... | E01H 1/00 244/114 R |
| 8,186,469 B2 | * | 5/2012 | Yim ........................ | B25J 5/007 180/218 |
| 8,340,851 B2 | * | 12/2012 | Wang ........................ | B61B 3/02 700/245 |
| 8,958,911 B2 | * | 2/2015 | Wong ..................... | G05D 1/024 700/258 |
| 9,656,806 B2 | * | 5/2017 | Brazeau ............... | B65G 1/1378 |

(Continued)

*Primary Examiner* — James M Dolak (57) ABSTRACT

A laser radar module includes a laser radar, an upper cover disposed above the laser radar, a lower case disposed below the laser radar, and a locking assembly for connecting the upper cover to the lower case. A gap is formed between the upper cover and the lower case for the laser radar to transmit and receive signals.

11 Claims, 11 Drawing Sheets

(56) References Cited

U.S. PATENT DOCUMENTS

| | | | |
|---|---|---|---|
| 9,815,192 B1 * | 11/2017 | Du | B25J 9/102 |
| 9,821,959 B2 * | 11/2017 | Hognaland | B60L 15/40 |
| 10,048,697 B1 * | 8/2018 | Theobald | G05D 1/0268 |
| 10,293,676 B2 * | 5/2019 | Schnapp | B60K 7/0007 |

* cited by examiner

LASER RADAR MODULE AND ROBOT

CROSS REFERENCE TO RELATED APPLICATIONS

This application claims priority to Chinese Patent Applications No. 201710355332.5 and 201710355364.5, both filed on May 19, 2017, which are hereby incorporated by reference herein as if set forth in its entirety.

BACKGROUND

1. Technical Field

The present disclosure generally relates to the field of robotics, and particularly to a laser radar module and a robot.

2. Description of Related Art

Laser radar has a wide range of applications, and smart devices, such as service robots can use laser radar to realize environmental detection. It can obtain information of a target, such as distance, orientation, height, speed, attitude and even shape, by transmitting a laser detection signal (i.e., laser beam) to the target and then receiving the signal (target echo) reflected by the target with the transmitted signal and comparing the transmitted signal and the received signal and carrying out information processing, so as to detect, track and identify the target.

According to the working principle of the laser radar, the laser radar cannot be obstructed during operation, otherwise the laser radar will receive the signal reflected by the obstacle rather than the signal reflected by the target, resulting in the failure of target detection, tracking and identification. In order to avoid the occurrence of the obstructing of laser radar, the laser radar of some conventional robots is usually arranged at the outside of the housing of the robots. Since the laser radar is exposed to the outside environment, it may tend to be damaged or even worse, causing security problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

FIGS. 1-4 show the bottom portion (also referred to as the waist) of a robot according to an embodiment. In a two-stage robot, the robot includes a waist and a head connected to the waist. The robot further melodies a driving structure 50 at the waist. In a three-stage robot, the robot includes a bottom portion, a waist connected to the bottom portion, and a head connected to the waist. In this situation, the driving structure 50 is connected to the bottom portion.

Referring to FIGS. 1-4, the bottom portion or the waist structure includes a base 20, a housing 30 arranged on the base 20, an inner stacking structure 40 arranged on the base 20 and located within the housing 30, a driving structure 50 arranged outside the base 20, and a laser radar module 10 on the chassis 20 and located within the housing 30. The housing 30 includes a front housing 31 and a rear housing 32 that are fixed together by screws. The front housing 31 and the rear housing 32 can be fixed to a mounting plate 440 by screws.

The front housing 31 may include a depths camera 60 for acquiring environmental images and transmitting the acquired environmental images to a main control circuit board of the robot so that the main control circuit board controls the driving structure 50 to operate or controls other components according to the environmental images. Specifically, the robot further includes a sensor, such as an ultrasonic sensor 70 or an infrared sensor. The ultrasonic sensor 70 is arranged inside the housing 30 and is located above the laser radar module 10. The housing 30 may include accordingly a window 34 which is arranged above a signal transmitting and receiving through hole 33 of the housing 30 and opposite to the ultrasonic sensor 70 so that the signal transmitted from and received by the ultrasonic sensor 70 can pass through the window 34 without being blocked by the housing 30. In one embodiment, the window 34, the through hole 33 and the depth camera 60 are arranged at the front housing 31. The window 34 may be covered by a screen with a number of through holes.

Figure 1:
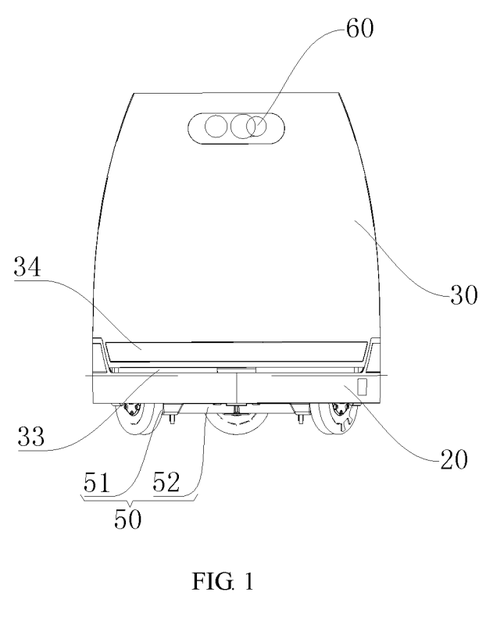
FIG. 1 is an isometric view of a robot according to one embodiment.
Figure 2:
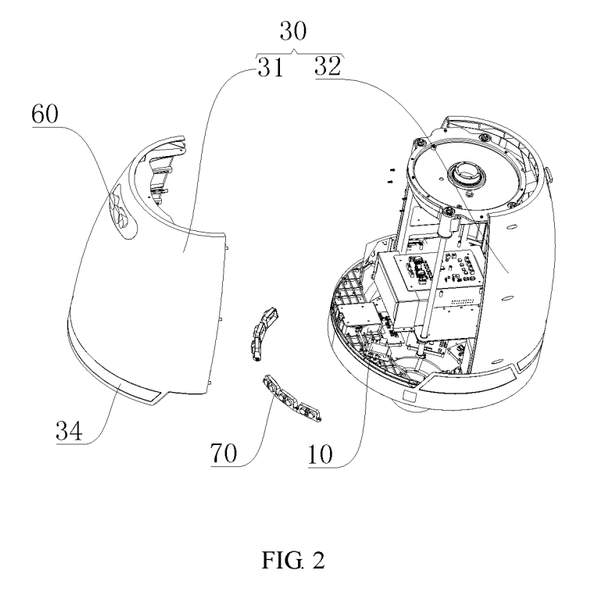
FIG. 2 is an isometric exploded view of a robot according to one embodiment.
Figure 3:
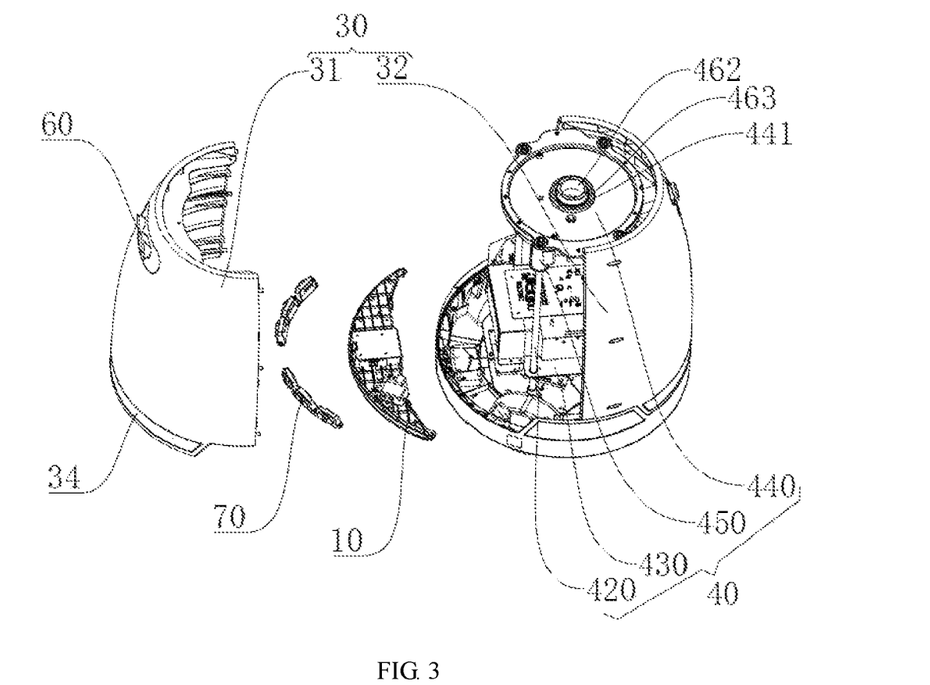
FIG. 3 is another isometric exploded view of a robot according to one embodiment.
Figure 4:
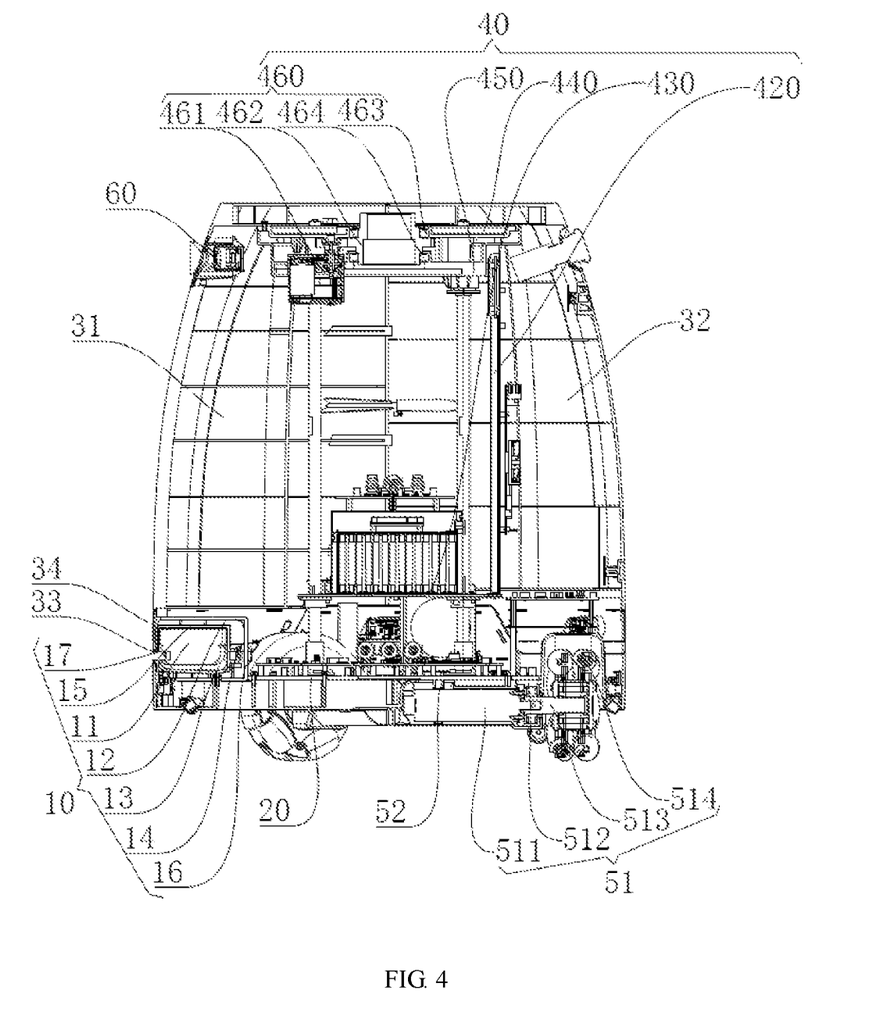
FIG. 4 is planar sectional view of a robot according to one embodiment.

The inner stacking structure 40 includes at least three support bars 420 arranged on the base 20, a separating plate 430 arranged on the support bars 420, and a mounting plate 440. Specifically, lower ends of the support bars 420 are fixed to the base 20 and the top ends are fixed to the mounting plate 440. The support bars 420 do not extend along the same straight line so that they can constitute a stable support structure. The separating plate 430 is substantially parallel to the base 20 or the mounting plate 440 so that the separating plate 430 can divide the space between the base 20 and the mounting plate 440 into two accommodation spaces. The base 20, the separating plate 430, and the mounting plate 440 each include one or more mounting areas for mounting components. For example, a power supply of the robot can be mounted on a mounting area of the separating plate 430. The assembling process of the inner stacking structure 40 is simple and convenient, and the inner stacking structure 40 has a better stability.

The inner stacking structure 40 further includes a gearbox 450 disposed on the support bars 420 and below the mounting plate 440 and a gear assembly 460 mounted within the gearbox 450. The gearbox 450 includes therein one or mote mounting areas (not shown). The gear assembly 460 includes a servo 461, a gear 462, an upper bearing 463, and a lower bearing 464. The gear 462 is fixed to the mounting plate 440 via the upper bearing 463 and fixed to the gear box 450 via the lower bearing 464. The upper bearing 463 and the lower bearing 464 are provided so as to support the gear 462 and enable the gear 462 to rotate with respect to the mounting plate 440 and the gear box 450. The servo 461 is disposed at a servo mounting area and the output gear of the servo 461 is engaged with the gear 462. When the servo 461 operates upon receiving a control signal from the main circuit board, the output gear drives the gear 462 engaged therewith to rotate so that the gear 462 drives the waist or the head of the robot to rotate.

The driving structure 50 includes at least two driving assemblies 51 disposed outside the base 20 and a fixing assembly 52 for fixing the driving assembly 51 to the outside of the base 20. If the driving assembly 51 fails, the driving assembly 51 can be replaced without disassembling the base, which is conducive to the maintenance of the driving assembly 51. In the embodiment, the driving assembly 51 includes, a motor 511, a bearing 512, a connection shaft 513 connected to the output shaft of the motor 511, and a wheel 514 connected to the connection shaft 513, which are arranged along the radial direction of the base 20. The motor 511 is connected to a motor control circuit board (not shown) arranged inside the base 20 through a signal line and can drive the wheel 514 to rotate according to a control signal outputted from the motor control circuit board, thereby enabling the robot to move.

Figure 5:
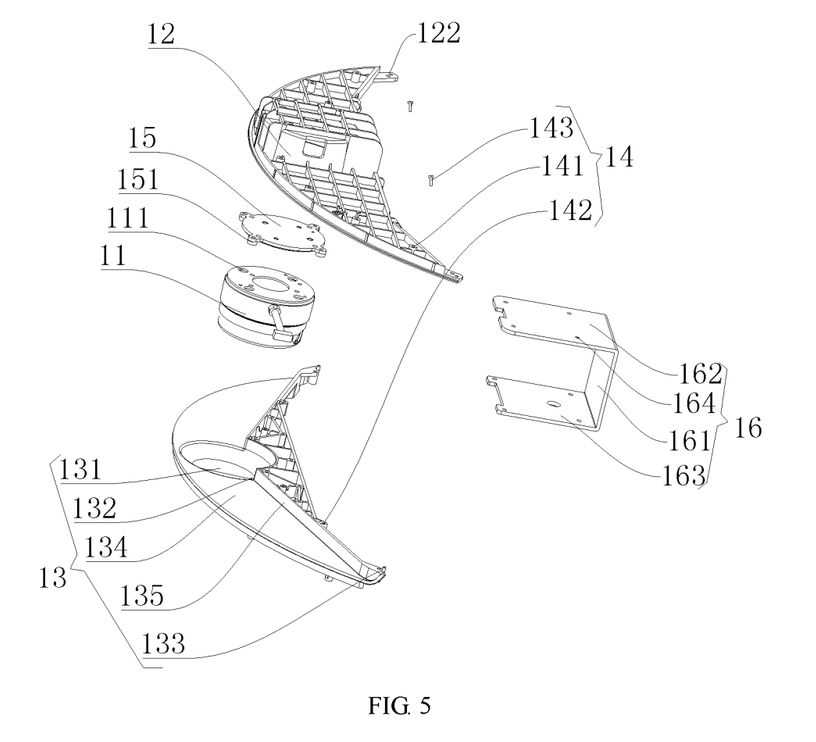
FIG. 5 is an isometric exploded view of a laser radar module according to one embodiment.
Figure 6:
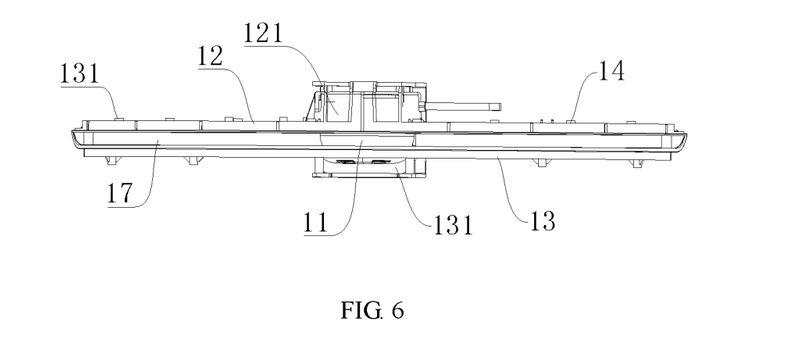
FIG. 6 is a planar side view of a laser radar module according to one embodiment.

The housing 30 defines a signal transmitting/receiving through hole 33. In the embodiment, the hole 33 is located at the boundary between the front housing 31 and the base 20. The laser radar module 10 is arranged on the base 20 and is located in the housing 30 and is disposed opposite to the through hole 33. Referring to FIGS. 5 and 6, the laser radar module 10 includes a laser radar sensor 11, an upper cover 12 disposed above the laser radar sensor 11, a lower case 13 arranged below the laser radar sensor 11, and a locking assembly 14 for connecting the upper cover 12 to the lower case 13. A gap 17 is formed between the upper cover 12 and the lower case 13 for the laser radar sensor 11 to transmit and receive signals. The gap 17 matches with the through hole 33 in the housing 30. The lower edges of the upper cover 12 and the lower case 13 are arc-shaped. The curvature of the upper cover 12 and the lower case 13 matches the curvature of the base 20 so as to be more harmonious when assembled on the base 20.

The laser radar module 10 of the embodiment includes a top cover 12 above the laser radar sensor 11 and a lower case 13 below the laser radar 1. A lock assembly 14 is used to lock the upper cover 12 to the lower case 13 to house the laser radar sensor 11 in the space defined by the upper cover 12 and the lower case 13, thus protecting the laser radar sensor 11. The gap 17 formed between the upper cover 12 and the lower case 13 allows the laser radar sensor 11 to transmit and receive a signal, so as to prevent the laser radar sensor 11 from being damaged while ensuring the normal operation of the lidar 11.

Specifically, the upper cover 12 defines a receiving hole 121 for receiving the laser radar sensor 11, and the lower case 13 defines a position limiting hole 131 matching the laser radar sensor 11. The receiving hole 121 is opposite to and parallel to the position limiting hole 131. When being assembled, the laser radar sensor 11 is first fixed in the receiving hole 121 of the upper cover 12. The hole 131 in the lower case 131 then aligned with the laser radar sensor 11 so that the laser radar sensor 11 is received in the receiving hole 121 and the hole 131. The upper cover 12 is then connected to the lower case 13 through the locking assembly 14. The laser radar sensor 11 is thus protected by the upper cover 12 and the lower case 13. The assembly process is simple and convenient. In the embodiment, the laser radar sensor 11 is arranged upside down in the receiving hole 121, and its bottom portion is fixed to the upper cover 12 by screws. Since the upper and lower portions of the laser radar sensor 11 are rotatable with respect to each other, the top portion of the laser radar sensor 11 needs to be spaced apart from the bottom of the hole 131. In the embodiment, the ultrasonic sensor 70 is provided above the upper cover 12 and is located outside the receiving hole 121.

Referring to FIGS. 5-6, the lower case 13 includes a support portion 134 and a stopper portion 135 extending upwardly from the support portion 134, and a height of the supportportion 134 matches with a height of the gap 17. It is to be understood that a gap 17 is formed between the upper cover 12 and the support portion 134 of the bottom case 13 when the laser radar sensor 11 is mounted to the top cover 12. The gap 17 matches the through hole 33 in the front housing 31 so as to allow the laser radar sensor 11 to send a laser signal and receive the reflected signal from a target. An edge of the support portion 134 of the lower case 13 is arc-shaped. The hole 131 is arranged in a center of the support portion 134. Two limiting walls 135 extend along the edge opposite to the arc-shaped edge and form therebetween an angle. The angle can be set according to the required detecting range of the laser radar sensor 11 so that the laser signal can pass through the gap 17 formed between the lower case 13 and the upper cover 12 when the laser radar sensor 11 operates.

In one embodiment, a drain outlet 132 is defined in the position limiting hole 131. The base 20 defines a channel under the drain outlet 132. Water that enter into the hole 131 can flow into the channel through the drain outlet 132 and finally flow outside of the base 20, thereby avoiding that the laser radar module 10 cannot operate normally due to the water entering into the hole 131.

In one embodiment, the laser radar module 10 further includes a rubber pad 15 disposed between the laser radar sensor 11 and the upper cover 12. The rubber pad 15 can further protect the laser radar sensor 11, and prevents the laser radar sensor 11 from being worn due to directly contacting tire upper cover 12. The rubber pad 15 includes a number of positioning protrusions 151, and the laser radar sensor 11 defines a number of positioning orifices 111 matching the positioning protrusions 151. When assembling, it needs to fix the rubber pad 15 to the laser radar sensor 11 so as to prevent the laser radar sensor 11 from being worn. In the embodiment, the number of the positioning protrusions 151 is four, and the number of the positioning orifices 111 is four.

In one embodiment, the upper cover 12 defines a number of position limiting holes 122, and the lower case 13 includes a number of posts 133 matching the position limiting holes 122. The posts 133 are fit in the holes 122 so as to connect the upper cover 12 to the lower case 13. The laser radar sensor 11 is then held in position between the upper cover 12 and the lower case 13. The upper cover 12 and lower case 13 each include a number of reinforcing ribs so as to increase the strength of the upper cover 12 and the lower case 13, thereby providing a safe environment for the laser radar sensor 11 between the upper cover 12 and lower case 13.

The locking assembly 14 includes a through hole 141 defined in the upper cover 12, a threaded hole 142 defined in the lower case 13, and a screw 143 passing through the through hole 141 and engaged with the threaded hole 142. When assembling, the screw 143 is caused to pass through the through hole 141 and turned into the threaded hole 142, thereby fixing the upper cover 12 to the lower case 13. The laser radar sensor 11 is thus held in position between the upper cover 12 and lower case 13.

In one embodiment, the laser radar module 10 further includes a reinforcing member 16 for further strengthening the connection between the upper cover 12 and the lower case 13. The reinforcing member 16 includes a first reinforcing portion 161, a second reinforcing portion 162, and a third reinforcing portion 163. The second reinforcing portion 162 and the third reinforcing portion 163 are parallel to each other and perpendicular to the first reinforcing portion 161. The second reinforcing portion 162 is fixedly connected to the upper cover 12, and the third reinforcing portion 163 is fixedly connected to the lower case 13. Specifically, the second reinforcing portion 162 and the third reinforcing portion 163 each define a through hole 164, and the upper cover 12 and the lower case 13 define correspondingly threaded holes (not shown). The reinforcing member 16 can be securely connected to the upper cover 12 and lower case 13 via screws (not shown).

Figure 7:
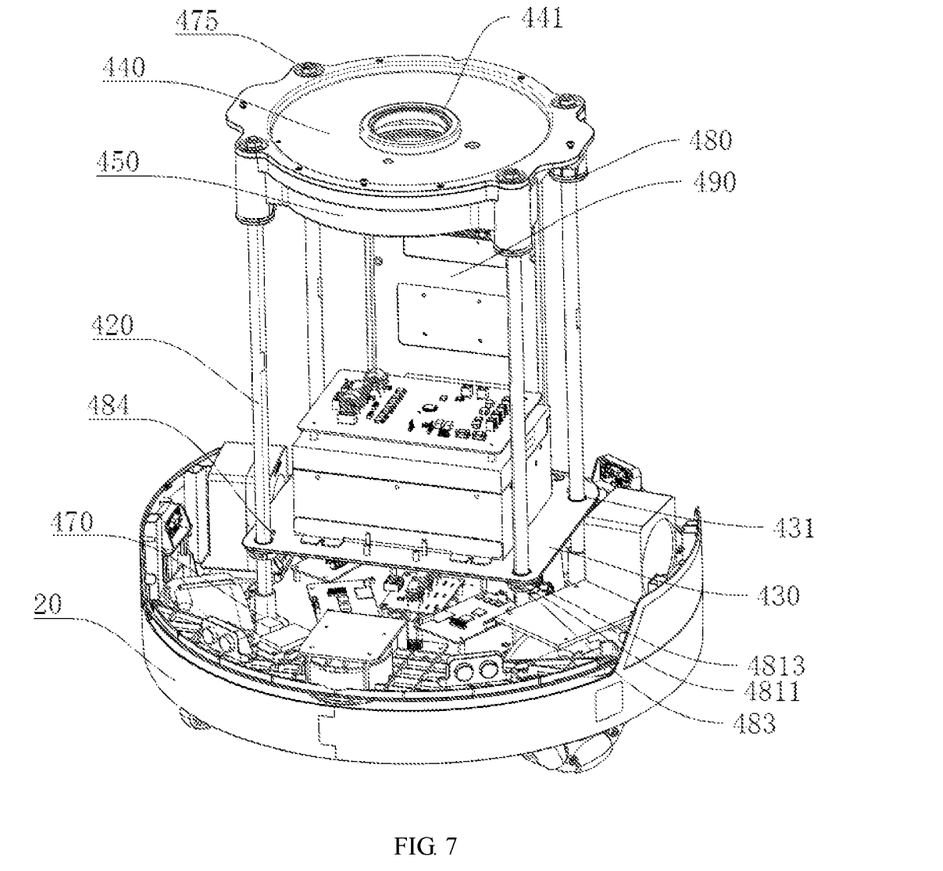
FIG. 7 is an isometric view of an inner stacking structure according to one embodiment.
Figure 8:
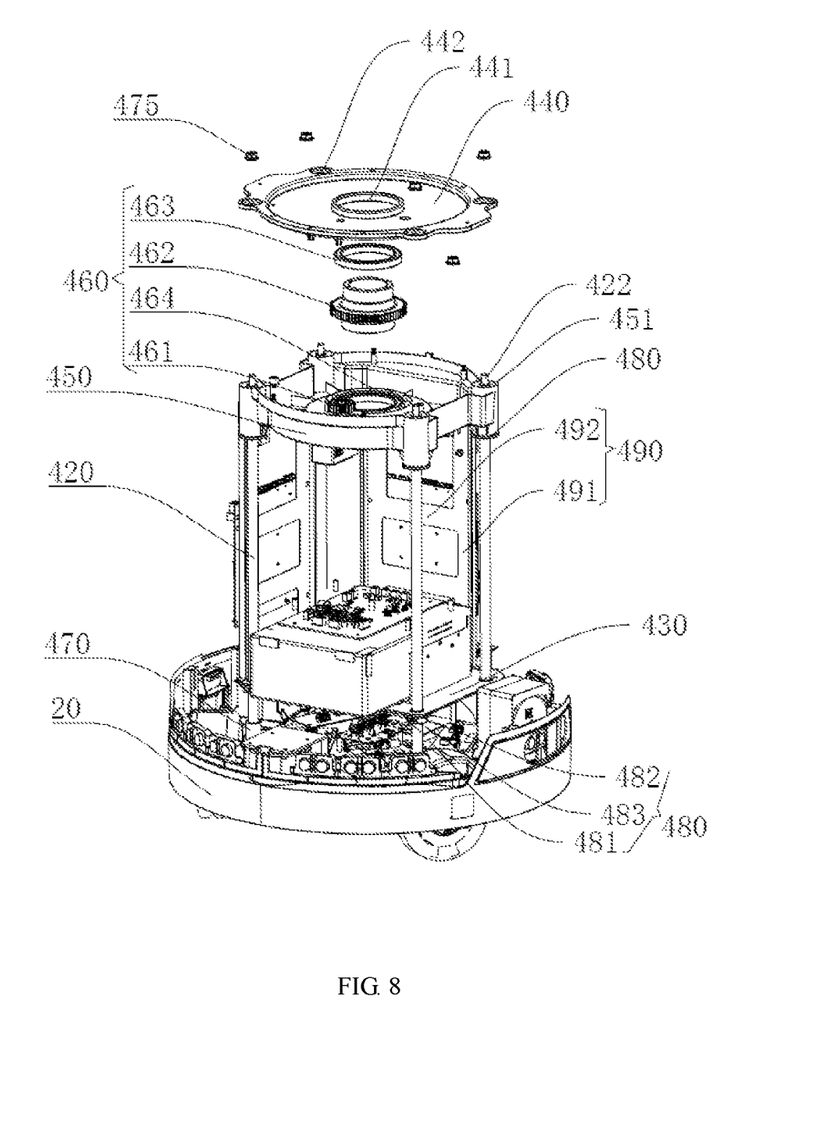
FIG. 8 is a partially exploded view of the inner stacking structure of FIG. 7.
Figure 9:
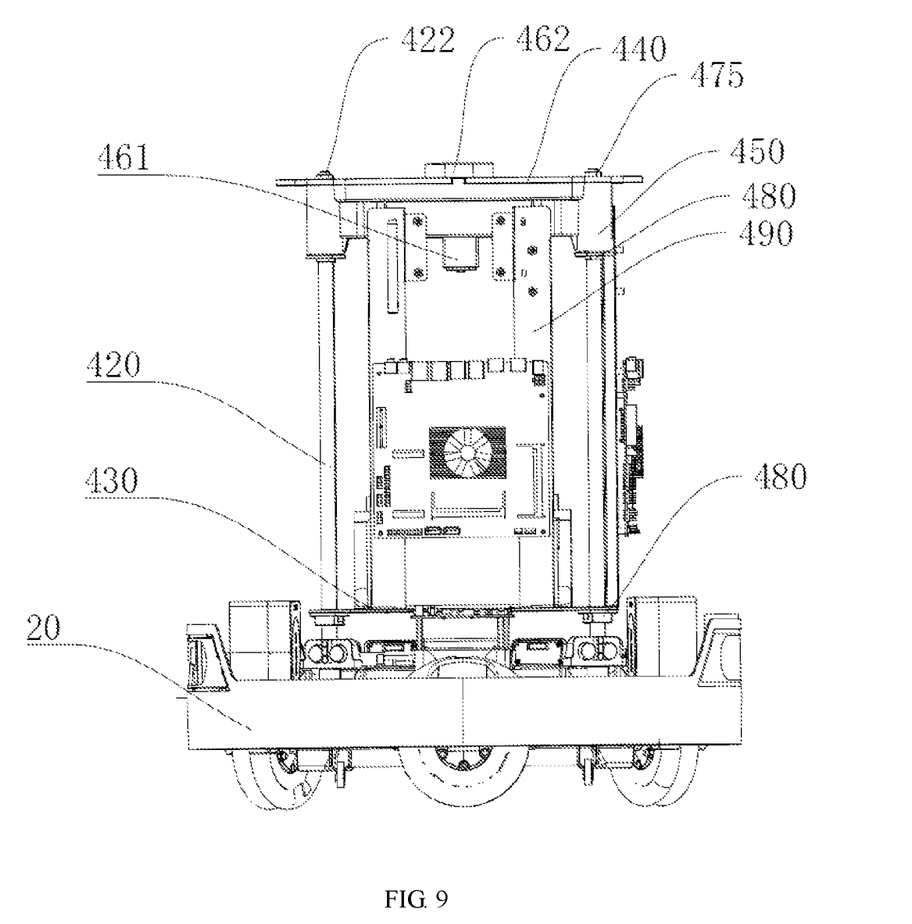
FIG. 9 is a planar front view of the inner stacking structure of FIG. 7.

Referring to FIGS. 7-9, a top portion of the gear assembly 460 extends out of a through hole 441 defined in the mounting plate 440. The top portion is connected to the head or waist of the robot so as to enable the head to rotate with respect to the waist or enable the waist to rotate with respect to the bottom portion of the robot.

It is to be understood that servo control circuit may be arranged within the gear box 450 and is electrically connected to the servo 461. When the servo 461 operates, the output shaft of the servo 461 rotates the gear 462 engaged therewith, causing the head or waist connected to the top of the gear 462 that extends out of the through hole 441 to rotate.

During the assembling of the inner stacking structure 40, components such as an ultrasonic sensor, an infrared sensor, a sensor control circuit and a motor control circuit are first mounted on the base 20. The support bars 420 are then mounted on the base 20. The separating plate 430 is then fixed to the support bars 420, and a power supply and control circuit are then mounted on the separating plate 430. The gear assembly 460 is then mounted in the gear box 450, and the gear box 450 is then mounted on the top of the support bars 420.

In the inner-stacking structure, the space between the base 20 and the mounting plate 440 can be divided into at least two accommodating spaces by the separating plate 430. Components that are mounted at the base 10, the separating plate 430 and the mounting plate 440 are located within the at least two accommodating spaces. The assembling process of the inner stacking structure 40 is thus simple and convenient, and the inner stacking structure 40 has a better stability.

The inner stacking structure 40 further include a number of fixing assemblies 470, some of which are fixed to the base 20, and some of which are used to fix the mounting plate 440 to the support bars 420. Each of the support bars 420 includes a threaded section 422 at its top and defines a first threaded hole in its bottom. Each of the support bars 420 includes a protrusion 423 on the bottom end and one threaded hole is defined in the end of the protrusion 423. The base 20 defines correspondingly a number of second threaded holes (not shown). The mounting plate 440 defines correspondingly a number of through holes 442 that allow the tops of the support bars 420 to pass therethrough.

Figure 10:
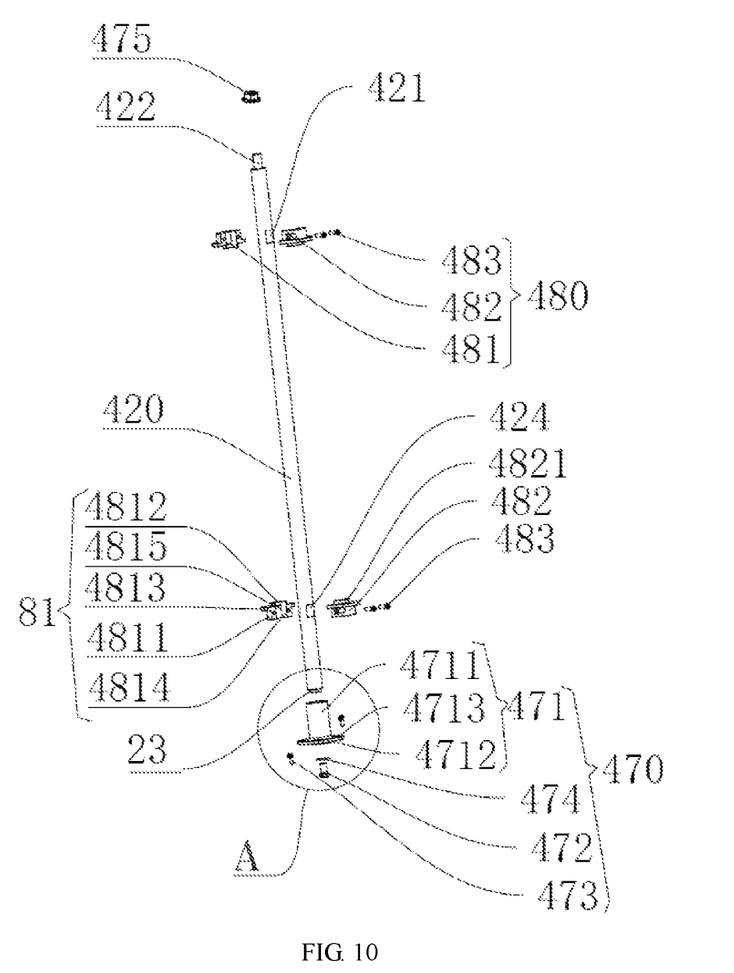
FIG. 10 is an isometric view of an assembly including a support bar, two support assemblies and a fixing assembly of the inner stacking structure of FIG. 7.
Figure 11:
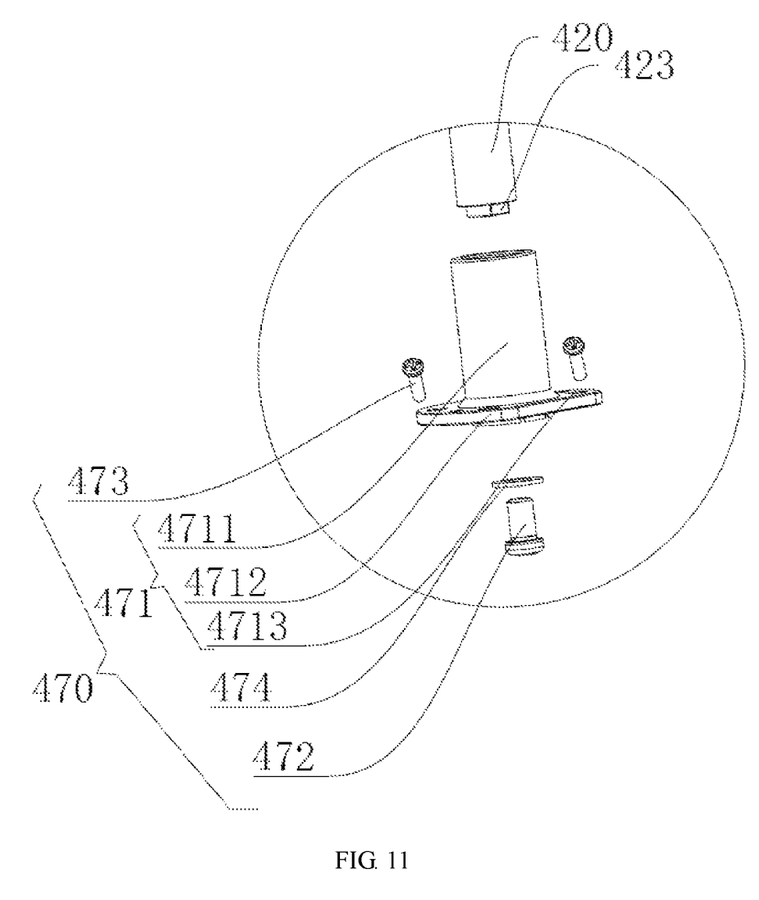
FIG. 11 is a partially exploded view of portion A of FIG. 10.

Referring, further to FIGS. 10-11, each of the fixing assemblies 470 includes a holder 471, a first screw 472 and a second screw 473. The first screws 471 are engaged with the first threaded holes of the support bars 420 to fix the support bars 420 to the holders 471. The second screws 473 are engaged with the second threaded holes to fix the holders 471 to the base 20.

Each holder 471 includes a connecting portion 4711 and a fixing portion 4712 that are integrally formed by stamping or injection molding. The connecting portion 4711 is tubular and has a hollow space that allows the end of one support bar 420 to be inserted thereinto. The connecting portion 4711 has an inner diameter substantially the same as an outer diameter of each of the support bars 420, and defines an aperture matching the protrusion 423. The protrusion 423 includes a planar lateral surface and the inner lateral surface of the aperture includes a planar surface that contacts the planar lateral surface so as to prevent the support bars 420 from rotating with respect to the holders 471. The fixing portion 4712 extends radially front one end of the connection portion 4711 and defines a number of through holes 4713 that allow the second screws 473 to pass therethrough. During assembling, one end of each support bars 420 is first inserted into a corresponding connection portion 4711. The support bars 420 are then fixed to the connection, portions 4711 via first screws 472. The fixing portions 4712 are then fixed to the base 20 via second screws 473 that pass through the through holes 4713 and are engaged with the second threaded holes in the base 20. The support bars 420 are then fixed to the base 20. The assembling process is simple, which is conducive to enhance the assembling efficiency of the robot.

Each fixing assembly 470 further includes a washer 474 disposed between the first screw 472 and the first threaded hole to function to reduce the supporting surface stress. Specifically, the outer diameter of the washer 474 is greater than the inner diameter of the aperture in the connection portion 4711 to ensure that the support bars 420 are fixed to the holders 471. It is to be understood that the support bars 420 are fixedly connected to the base 20 by fixing the support bars 420 through the holders 471 and fixing the holders 471 to the base 20 by the second screws 473.

In one embodiment, each fixing assembly 470 further includes a nut 475 which is engaged with the threaded section 422 of one support bar 420. When the inner stacking structure 40 is assembled, the support bars 420 are fixed to the base 20 through the holders 471. The separating plate 430 and the gear box 450 are then mounted to the support bars 420. The mounting plate 440 is then orientated to allow the threaded sections 422 of the support bars 420 to pass through the through holes 442 of mounting plate 440. After that, the nuts 475 are turned onto the threaded sections 422 to fixing the mounting plate 440 to the supporting bars 420.

Each of the support bars 420 includes at least one lock receiver 421. The number of the at least one lock receiver 421 is the same as the number of the separating plate 430. The number of the mounting plate 430 is determined by the number of the accommodating spaces between the base 20 and the mounting plate 440. In the embodiment, the number of the accommodating spaces is two and it requires one mounting plate 430. The inner stacking structure 40 further includes a support assembly 480 fixed to each lock receiver 421 for supporting the separating plate 430 or the gear box 450.

As shown in FIG. 10, the support assembly 480 includes a first lock member 481, a second lock member 482, and one or more screws 483 that connect the first lock member 481 to the second lock member 482. The first lock member 481 and the second lock member 482 corporately form a lock that is engaged with the lock receiver 421. During assembling, the first lock member 481 and the second lock member 482 are respectively held at the lock receiver 421, and then they are connected to each other by screws 483, thereby fixing the support assembly 480 to the support bars 420. The separating plate 430 or the gear box 450 can then fixed to the support assembly 480. It is thus easy to fix the separating plate 430 or the gear box 450 to the support bars 420.

The lock receiver 421 includes two position limiting recesses 421 that is located in one support bar 420 and opposite to each other. Each of the first lock member 481 and the second lock member 482 includes therein a projection 4815. The two projections 4815 are respectively engaged with the two position limiting recesses 421 so as to prevent the first lock member 481 and the second lock member 482 from moving along the support bar 420.

In one embodiment, each support bar 420 is cylindrical. The lock receiver 421 is constituted by the two position limiting recesses 421 located at the lateral surface of the support bar 420. As shown in FIG. 10, each of the first lock member 481 and the second lock member 482 includes a body 4811 defining a cavity 4812 that extends from a top end to an opposite bottom, end thereof. The two projections 4815 respectively protrude from lateral surfaces of the cavities 4812 of the first lock member 481 and the second lock member 482. The cavities 4812 of the first lock member 481 and the second lock member 482 are sized and shaped corresponding to the diameter of the support bare 420. That is, the cavities 4812 of the first took member 481 and the second lock member 482 corporately form a cylindrical hole that has a diameter substantially the same as the diameter of one support bar 420. Each of the first lock member 481 and the second lock member 482 further includes a projection portion 4813 protruding radially from a lateral surface of the body 4811 thereof and used to provide a support function.

As shown in FIG. 10, the body 4811 of the first lock member 481 defines two threaded holes 4814 that are used to be engaged with the screws 483. The body 4811 of the second lock member 482 defines two stepped holes 4821. Each hole 4821 includes a first hole portion with a greater diameter and a second hole portion with a smaller diameter. The second hole portion allows the shank of a screw 483 to pass therethrough the first hole portion is used to receive the head of the screw 483. During assembling, the screws 483 are first caused to pass through the holes 4821 and then turned to be engaged with the threaded holes 4814, thereby fixing the first lock member 481 and the second lock member 482 to the corresponding lock receiver 421.

The separating plate 430 defines a plurality of first connection holes 431 sized and shaped corresponding to an upper hall of the body 4811 that is located above the projection portion 4813. The upper halves of the bodies 4811 of the first lock member 481 and the second lock member 482 can thus be received in the first connection holes 431, with the lower surface of the separating plate 430 that faces the base 20 supported by the projection portions 4813. The separating plate 430 is thus held in position by the support of the first lock members 481 and the second lock members 482.

The gear box 450 defines a number of second connection holes 451 sized and shaped corresponding to a lower half of the body 4811 that is located below the projection portion 4813. The lower halves of the bodies 4811 of the first lock member 481 and the second lock member 482 can thus be received in the second connection holes 431, with the bottom of the gear box 450 that feces the separating plate 430 supported by the projection portions 4813. The gear box 450 is thus held in position by the support of the first lock members 481 and the second lock members 482. It should be noted that the first support members 481 and the second support members 482 for supporting the gear box 450 are orientated upside down, while the first support members 481 and the second support members 482 for supporting the separating plate 430 are in an upright orientation, which is shown in FIG. 4.

The projection portion 4813 defines a connecting through hole (not shown), and the separating plate 430 or the gear box 450 defines a threaded hole (not shown) corresponding to the threaded hole. Each support assembly 480 further includes a screw 484 passing through the connection through hole and engaged with the threaded hole. With such configuration, the separating plate 430 or the gear box 450 is thus connected to the projection portions 4813 of the support assemblies 480.

The inner stacking structure 40 further includes a support plate 490 connected between two adjacent support bars 420. The top end of the support plate 490 is fixed to the gear box 450, and the bottom end of each of the support plates 490 is fixed to the separating plate 430. The support plate 490 includes one or more mounting areas for mounting components. In the embodiment, the support plate 490 defines a number of mounting holes that are engaged with screws or other fastening members to connect the support plate 490 to the gear box 450 or the separating plate 430 or connect other components to the support plates 490. A circuit board or other components can be mounted on the one or more mounting areas of the mounting plate 490.

As shown in FIG. 8, the support plate 490 includes two first connecting portions 491 that extend along the heightwise direction thereof and are parallel to each other, and two second connecting portions 492 that extend along the widthwise direction thereof and are parallel to each other. The second connecting portions 492 are arranged between the first connecting portions 491, and the width of each second connecting portion 492 is substantially the same as the size of a circuit board or other components to be mounted on the second connecting portions 492. The width of the support plate 490 is substantially the same as the distance between the two adjacent supporting fears 420 so as to arrange the support plate 490 between the two supporting bars 420.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A robot comprising a base, a housing and a laser radar module arranged on the base and within the housing, the laser radar module comprising a laser radar sensor, an upper cover disposed above the laser radar sensor, a lower case disposed below the laser radar sensor, and a locking assembly for connecting the upper cover to the lower case, a gap between the upper cover and the lower case for the laser radar sensor to transmit and receive signals, and the housing defining a through hole matching the gap;

wherein the robot further comprises an inner stacking structure disposed within the housing, the inner stacking structure comprises a plurality of support bars, a separating plate and a mounting plate, one end of each of the support bars is fixed to the separating plate and an opposite end of each of the support bars is fixed to the mounting plate, and the separating plate is fixed to the support bars.

2. The robot of claim 1 further comprising an ultrasonic sensor disposed within the housing and located above the laser radar module, wherein the housing further defines a window disposed above the through hole and opposite to the ultrasonic sensor.

3. The robot of claim 1, further comprising a driving structure disposed outside the base, and a camera disposed on the housing.

4. The robot of claim 1, wherein the number of the plurality of support bars is at least three, and the support bars are parallel to one another.

5. The robot of claim 1, wherein the inner stacking structure further comprises a gear box and a gear assembly, the gear box is arranged on the support bars and under the mounting plate, and the gear assembly is arranged within the gear box.

6. The robot of claim 5, wherein the gear assembly comprises a servo, a gear, an upper hearing and a lower bearing, the gear is mounted on the mounting plate via the upper hearing, and mounted on the gear box via the lower bearing, and an output gear of the servo is engaged with the gear.

7. The robot of claim 5, wherein the inner stacking structure further comprises a support plate connected between two adjacent support bars, a top end of the support plate is fixed to the gear box, and a bottom end of the support plate is fixed to the separating plate.

8. The robot of claim 1, wherein each of the support bars defines a first threaded hole in a bottom thereof, the base defines a plurality of second threaded, holes, the inner stacking structure further comprises a plurality of fixing assemblies, each of the fixing assemblies comprises a holder for connecting with one of the support bars, a first screw and a second screw, the first screws are engaged with the first threaded holes to fix the support bars to the holders, and the second screws are engaged with the second threaded holes to fax the holders to the base.

9. The robot of claim 8, wherein each of the support bars comprises a protrusion on the bottom thereof, each holder comprises a connecting portion and a fixing portion, the connecting portion is tubular and has an inner diameter the same as an outer diameter of each of the support bars, the connection portion, defines an aperture matching the protrusion, the fixing portion is connected to one end of the connection portion, and defines a plurality of through holes that allow the second screws to pass therethrough.

10. The robot of claim 5, wherein each of the support bars comprises a lock receiver, the inner stacking structure further comprises a support assembly fixed to the lock receiver for supporting the separating plate or the gear box, the support assembly comprises a first lock member, a second lock member and one or more screws that connect the first lock member to the second lock member, and the first lock member and the second lock member together form a lock that is engaged with the lock receiver.

11. The robot of claim 10, wherein the lock receiver comprises two position limiting recesses, and each of the first lock member and the second lock member comprises therein a projection and the two projections are respectively engaged with the two position limiting recesses.

* * * * *